United States Patent
Le Moal et al.

(10) Patent No.: US 7,062,608 B2
(45) Date of Patent: Jun. 13, 2006

(54) STORAGE DEVICE ADAPTER EQUIPPED WITH INTEGRATED CACHE

(75) Inventors: Damien Le Moal, Tokyo (JP); Hiroshi Mine, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 124 days.

(21) Appl. No.: 10/783,753

(22) Filed: Feb. 20, 2004

(65) Prior Publication Data

US 2005/0108473 A1 May 19, 2005

(30) Foreign Application Priority Data

Nov. 13, 2003 (JP) ............................. 2003-383248

(51) Int. Cl.
G06F 12/00 (2006.01)
(52) U.S. Cl. ...................... 711/138; 711/113; 711/118; 711/137; 711/141
(58) Field of Classification Search ................. 711/138
See application file for complete search history.

(56) References Cited

U.S. PATENT DOCUMENTS

| | | | |
|---|---|---|---|
| 5,623,631 A * | 4/1997 | Tsuboi et al. ................ 711/143 |
| 5,640,600 A * | 6/1997 | Satoh et al. .................... 710/33 |
| 6,101,588 A | 8/2000 | Farley | |
| 6,237,046 B1 | 5/2001 | Ohmura et al. | |
| 6,275,897 B1 | 8/2001 | Bachmat | |
| 6,463,509 B1 | 10/2002 | Teoman et al. | |
| 6,606,715 B1 | 8/2003 | Kikuchi | |
| 2001/0011325 A1 * | 8/2001 | Day, III et al. .............. 711/113 |
| 2003/0149843 A1 | 8/2003 | Jarvis et al. | |
| 2004/0117441 A1 * | 6/2004 | Liu et al. ..................... 709/203 |
| 2004/0148473 A1 | 7/2004 | Hughes et al. | |

FOREIGN PATENT DOCUMENTS

| | | |
|---|---|---|
| JP | 2001-051901 | 2/2001 |
| WO | WO 03/017598 | 2/2003 |

* cited by examiner

Primary Examiner—Mano Padmanabhan
Assistant Examiner—Kaushikkumar Patel
(74) Attorney, Agent, or Firm—Townsend and Townsend and Crew LLP

(57) ABSTRACT

When streaming data is sent to a client, server capabilities are restricted by the ability to retrieve data from a storage unit, the data transfer rate drops and processing time increases. A device adapter that connects a host and a storage includes a cache controller, a cache interface that accesses a cache device and a storage interface that accesses the storage. With the cache controller, data retrieved from the storage can be stored in a cache without the awareness of a host computer. The cache controller includes a cache directory that manages storage region allocation of the cache and a monitor that maintains load and performance information of the storage and the cache. The storage and the cache are appropriately used not only depending on the presence of requested data inside the cache but also depending on the present load and performance of the storage.

10 Claims, 4 Drawing Sheets

FIG.4

| CACHE BLOCK NUMBER | STATUS | FINAL USE TIME | DEVICE ID | STARTING SECTOR | NUMBER OF SECTORS |
|---|---|---|---|---|---|
| 0 | IN USE | 100 | 1 | 0 | 150 |
| 1 | NOT IN USE | | | | |
| 2 | IN USE | 200 | 2 | 151 | 100 |
| ⋮ | | | | | |
| n | IN USE | 110 | 1 | 1050 | 27 | ns of the storage system. With this cache memory, caching
STORAGE DEVICE ADAPTER EQUIPPED WITH INTEGRATED CACHE

CROSS-REFERENCE TO RELATED APPLICATION(S)

This application claims priority based on a Japanese patent application, No. 2003-383248 filed on Nov. 13, 2003, the entire contents of which are incorporated herein by reference.

BACKGROUND OF THE INVENTION

The present invention relates to the retrieval and caching of data from a storage area network and in particular to a device adapter that enables the caching of data accessed from a storage without the support or alteration of an operating system (OS).

Network access storage systems, such as RAIDs (Redundant Arrays of Inexpensive Disks), that are accessed through a SAN (Storage Area Network) are extremely useful in terms of reliability and storage capacity expandability, and enable extremely fast data input and output (I/O). Such network access storage systems can be accessed with adaptability using fiber channel (FC) networks and IP networks to realize SANs and by using standard SCSI commands and SCSI/IP protocols such as iSCSI. As a result, multiple storage devices connected to a SAN can be simultaneously directly accessed from multiple host computers.

In such network access storage systems, the input/output speed may be restricted and the performance of the overall system may be diminished due to data of a storage device connected to a SAN being simultaneously accessed by multiple host computers. Specifically, the rate at which data is transferred from the storage device to the host computers is restricted by the physical bandwidth of the network media.

Thus, in some cases, even if the storage device can provide data rapidly, the system can still be slower than desired. Switches configured in the SAN process data transferred between multiple ports, either from the host computers to the storage device or from the storage device to the host computers. For that reason, a wide input/output internal bandwidth is required and it is necessary to efficiently process all input/output operations.

Two problems arise in the host computer accessing data through the network connected to the storage system, a drop in the data transfer rate and an increase in the amount of time necessary for input/output request processing. If the host computer is used as a multimedia streaming server, these problems are particularly serious because the performance of the server is restricted by its ability to retrieve data from the storage system to send the data to the client.

Specifically, if the data retrieval rate is slow, the host computer's performance as a server drops regardless of the operational processing ability of the host computer. When consideration is given to the sending of multimedia data requiring real time processing, data transmission delays arise due to the increased processing time for input/output requests. Thus, the quality of the multimedia that is sent, decoded and provided to the client may be impaired. Many storage systems designers are wrestling with these performance problems, and different solutions are being proposed to eliminate these.

First, solutions are being engineered in many storage systems by disposing a fast cache memory to circumvent access delays of the storage medium (e.g., a magnetic disk or tape) and to overcome delays in the input/output processing of the storage system. With this cache memory, caching of frequently accessed data becomes possible and lower-speed storage media may be used, while the amount of processing time of a request to input/output data is reduced (e.g., see Japanese Laid Open Patent Publication JP-A-2001-051901).

Caching methods in which the data are cached near a host computer are better solutions because the amount of consumption of the data transfer bandwidth inside the SAN can be reduced. Several cache devices connected to a device adapter used to access a SAN or a host expansion bus have been proposed. For example, in the device adapter disclosed in U.S. Pat. No. 6,463,509, a cache device is directly connected to an expansion bus (I/O bus) of a host computer. In this method, to cache a large volume of data, extremely flexible caching is realized by using a disk of an extremely large capacity as a cache storage medium.

There is also a method where caching operations are conducted in a device that is connected to a storage system and used to retrieve data from a SAN. Although the usefulness of the caching of data in the storage accessed by this device is reduced, overload of the host expansion bus during caching can be relieved.

As an example of this kind of device, the device adapter disclosed in International Publication No. 03/017598 can cache, in a disk connected to an access device, data retrieved from a storage system connected to an IP network. Thus, caching operations can be implemented in the device adapter without overloading the host expansion bus.

As an example of a host computer connected to a data cache, caching methods have been proposed that do not give consideration to differences in processing speeds between accessed storage systems and the highest data transfer rates of used cache storage. In the method disclosed in JP-A-2001-051901, however, use of the network bandwidth in the SAN cannot be reduced because caching is conducted in the access-destination storage device. Thus, this method cannot solve the drop in data transfer performance in the SAN. Moreover, ordinarily the size of the cache is not a size sufficient to retain a large amount of data, and with multimedia data files accessed by a streaming server, the efficiency of the overall cache drops in a case where multiple host servers continuously and simultaneously access large-volume data files.

In the method disclosed in U.S. Pat. No. 6,463,509, data retrieved from various storage devices through different types of interfaces can be cached in a caching device of a host operating system by changing device drivers and data transfer paths in the host operating system. With this method, high flexibility is achieved, but two serious problems arise. The first is that support from the operating system becomes necessary to process data caching and retrieval from the caching device. The use target operating system must support the hierarchy of the device driver.

The other problem is that the consumption of the bandwidth of the caching process-use expansion bus becomes excessive. There is the potential for the data that is to be cached to be transferred two times by the expansion bus in accordance with the type of bus used. The first time is when the data is transferred to the host memory from the device accessing the storage data, and the second time is when the data is transferred to the cache device from the host memory. There is the potential for performance in a where input/output is concentrated, such as multimedia streaming, to drop due to overloading of the host I/O bus.

In the method disclosed in International Publication No. 03/017598, the device is not given the function of conducting bandwidth control to precisely measure the load of the cache storage being used and the load of the interface used to retrieve data that is not cached, and the data retrieval destination is determined depending on whether or not the data is in the cache. The function of dynamically determining the data retrieval destination using the load status of the interface is necessary in the case of the retrieval of data characterized by real time processing, such as multimedia data.

In a case where, with respect to a specific type of input/output processing, the cache device performance during use is lower than that of the SAN connected to the storage device, the overall system could potentially drop. In a case where the obtained input/output request processing time (or at least an estimation thereof) is shorter than the input/output request processing time necessary for the input/output request processing of the cache device, there is the potential for the need to retrieve data from the storage system through the SAN to arise even if the data has already been cached. A classic example is the retrieval of data of small data blocks. Retrieval of small data blocks is ordinarily faster in a disk array system, due to the effect of disk striping, and slower in a single disk system whose disk seek overhead is large.

BRIEF SUMMARY OF THE INVENTION

The present invention provides a device adapter that connects a host computer and a main storage unit, effectively and flexibly caches data that the host computer retrieves from the main storage, and conducts a flexible sizing of the cache storage, an efficient caching process and dynamic control of a data retrieval destination to reduce the processing time of an input/output request made by the host computer.

According to one implementation of the invention, a device adapter that interconnects a host computer and a main storage unit includes a cache storage interface device for accessing a cache storage, a main storage interface device for accessing the main storage through a network, and a cache controller that processes a data output request made by the host computer.

The cache controller preferably includes: a processing unit that caches the data retrieved from the main storage in the cache storage; a processing unit that manages use and allocation of storage regions of the cache storage; a processing unit that manages load and performance information relating to the main storage and the cache storage; a processing unit that determines whether the requested data is cached; and a processing unit that determines, when the requested data is cached, and which of the cache storage and the main storage to use as the storage from which the requested data will be retrieved.

Moreover, in the device adapter, the caching processing unit does not cache the retrieved data in the cache storage when the retrieved data has already been cached in the cache storage or when the data transfer bandwidth of the cache storage interface device exceeds a preset threshold.

In addition, the load information is the present data transfer rate of the main storage interface device and/or the cache storage interface device, and the processing unit determining the storage from which the requested data will be retrieved determines the storage with reference to the present data transfer rate.

The performance information is the average request processing time of the main storage interface device and/or the cache storage interface device, and the processing unit determining the storage from which the requested data will be retrieved determines the storage with reference to the average request processing time.

According to the invention, data retrieved from storage unit connected through a network to a storage device can be effectively and flexibly cached in a device connected to a host computer, and the flexible sizing of cache storage, an efficient caching process that does not place a load on the system, and dynamic control of a data retrieval destination to reduce the processing time of an input/output request made by the host computer become possible.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 4 shows an example of an embodiment of a cache directory.

DETAILED DESCRIPTION OF THE INVENTION

Figure 1:
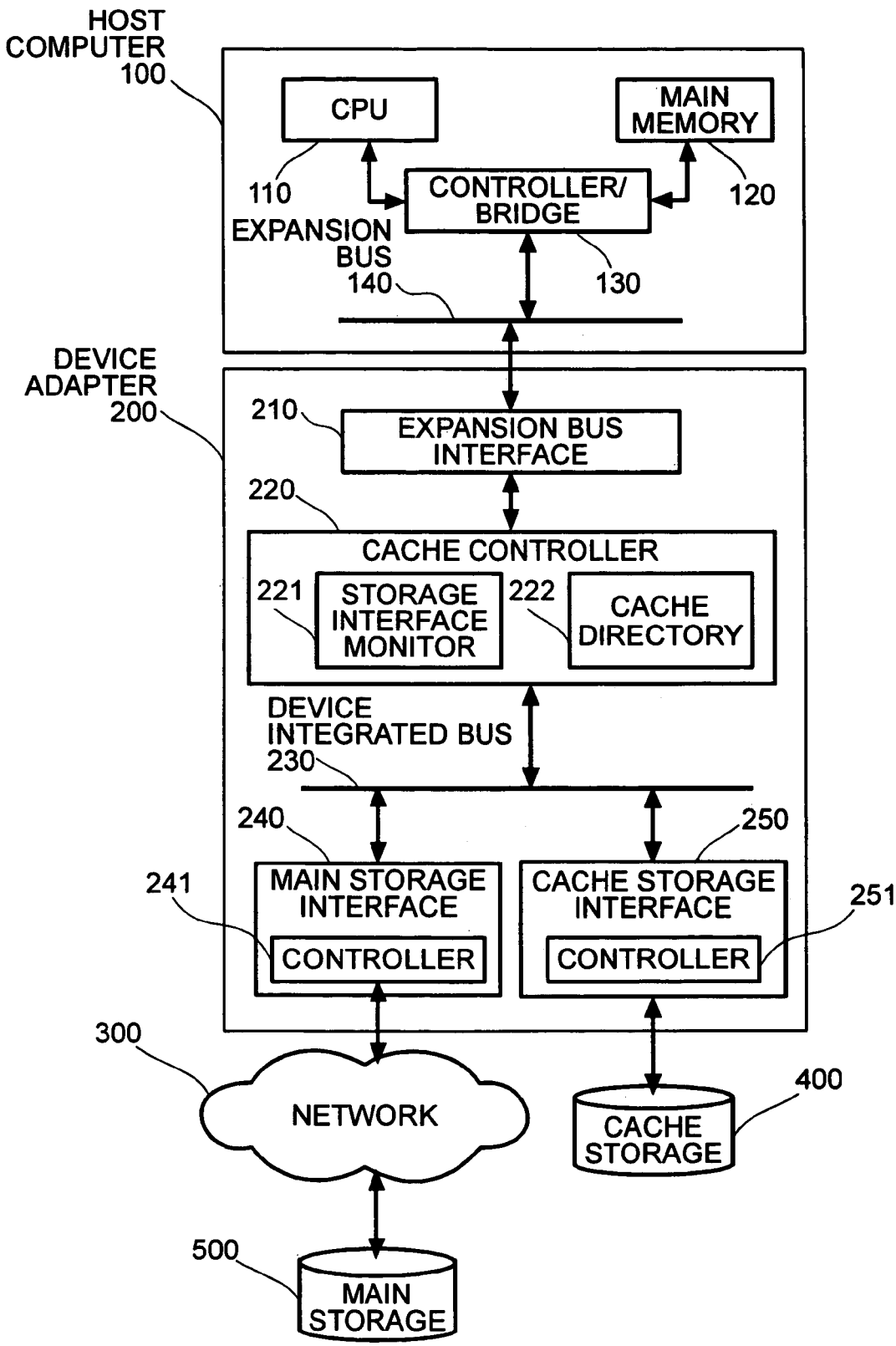
FIG. 1 a block diagram showing a simplified configuration of a disclosed device adapter.

A device adapter (200), which is connected to a common host computer (100), of the present invention is shown in FIG. 1. One or more CPUs (Central Processing Unit) (110) with which the host computer (100) is disposed access and execute programs stored in a main memory (120) through a memory bus managed by a controller/bridge (130). The programs that main memory (120) stores include application programs and a host operating system (OS) providing various services to applications such as device control by a device driver program.

Data transfer from device adapter (200) to main memory (120) is implemented through an expansion bus (140). Expansion bus (140) may also be configured by multiple buses rather than the single bus that is shown. Alternatively, device adapter (200) may also be directly connected to the memory bus managed by controller/bridge (130) without disposing an expansion bus. Device adapter (200) of the present example is connected to host computer (100) by expansion bus (140) using an expansion bus interface device (210).

Device adapter (200) includes a cache controller (220), a main storage interface device (240) and a cache storage interface device (250). Cache controller (220) includes a storage interface monitor (221) that monitors main storage interface device (240), cache storage interface device (250) and the use amount of a cache directory (222). Cache controller (220) manages storage region allocation of a cache storage (400), which is a local cache.

Each constituent element of device adapter (200) is realized by hardware or a processor executing a program. The processing flow described below is achieved by a processor, with which the device adapter is disposed, executing the program or controlling the hardware.

A main storage (500) is accessed through a network (300) and main storage interface device (240) including a controller (241). Cache storage (400) is accessed using cache storage interface device (250) including a controller (251).

Main storage interface device (240) and cache storage interface device (250) are connected to a device integrated bus (230) and implement data transfer with expansion bus (140) through the expansion bus interface device (210) and cache controller (220).

Device adapter (200) is operated as a single interface—i.e., as the main storage interface device (240)—from host computer (100). That is, cache controller (220) and cache storage (400) are hidden, and cache storage control and caching processing are executed, without the awareness of host computer (100), inside device adapter (200) disposed with cache controller (220).

Figure 2:
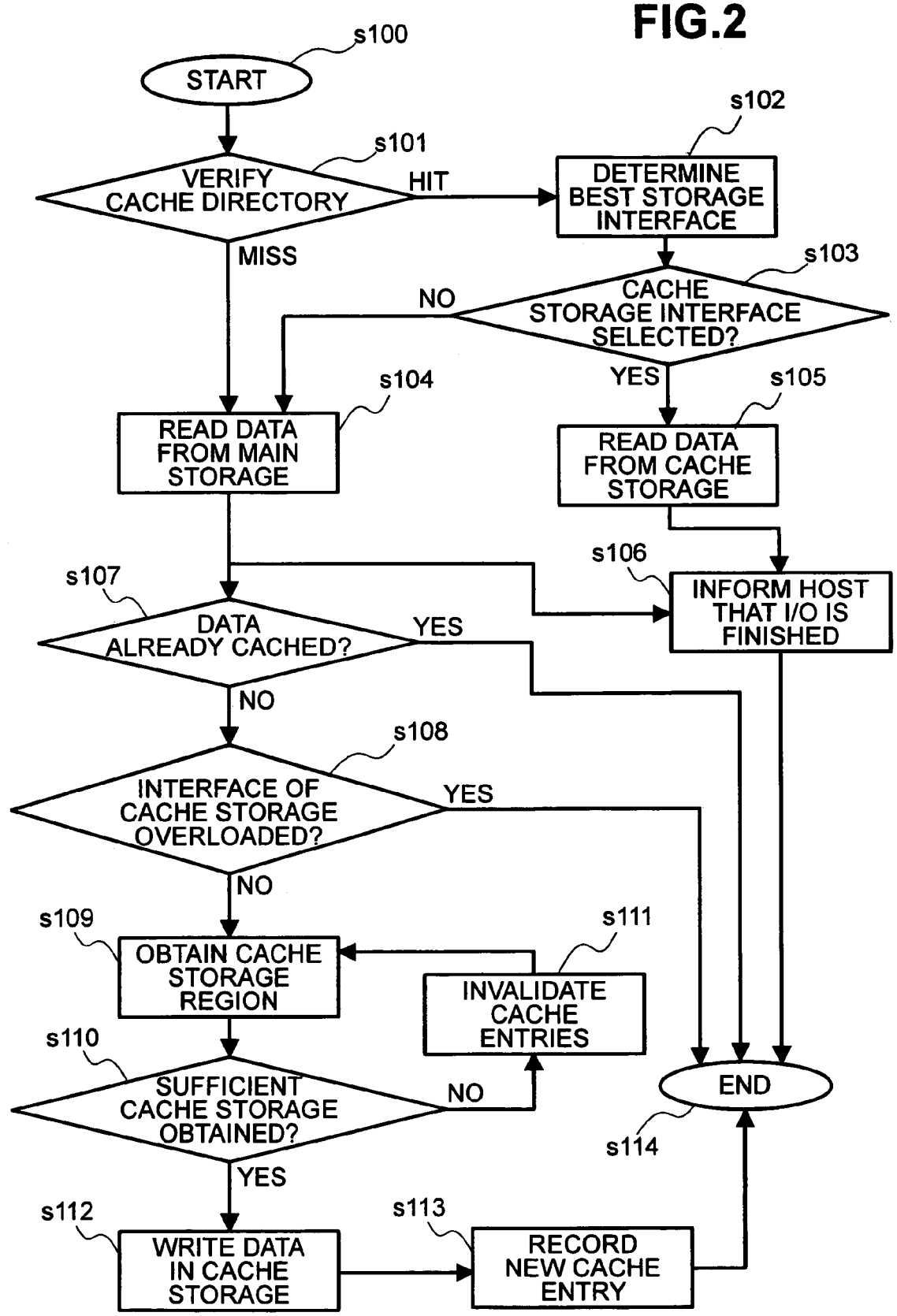
FIG. 2 is a simplified flow chart showing processing where a read input/output request is issued to the disclosed device adapter.

FIG. 2 shows the flow of processing, by device adapter (200), of a read input/output request issued by host computer (100). When cache controller (220) receives read request (s100), cache directory (222) is used to verify whether the data is recorded in cache storage (400) (s101). When the requested data is not cached in cache storage (400), the request is sent to main storage interface device (240) (s104) and data is retrieved from main storage (500). When the request is completed, host computer (100) is notified that processing is finished (s106) and the program requesting the data can resume execution without waiting for the completion of remaining processing.

The data is not cached in cache storage (400) in a case where the data retrieved in step (s104) is already cached (s107) or where the data transfer bandwidth of cache storage interface device (250) exceeds a preset threshold—i.e., when cache storage (400) is overloaded (s108). When the determination is "No" in both steps (s107) and (s108) (i.e., when the retrieved data is to be cached), cache controller (220) uses cache directory (222) to allocate a storage region in cache storage (400) (s109).

When a sufficient cache region has been allocated (s110), the data is written in cache storage (400) (s112) and cache directory (222) updates the completion of the writing operation (s113). In a case where cache region allocation fails, sometimes several cache directory entries are invalidated to empty a cache storage region (S111). In such a case, the cache directory entries to be invalidated can be selected by using the order of those that have not been used for the longest amount of time or by using another algorithm most suited for maximizing cache hit percentage.

When the requested data is in cache storage (400) (s101), cache controller (220) determines, in accordance with statistical information and the load monitored by storage interface monitor (221), which of cache storage interface device (250) and main storage interface device (240) is the best interface to use to retrieve the data (s102).

More specifically, storage interface monitor (221) monitors the data transfer rate of main storage interface device (240) and the data transfer rate of cache storage interface device (250), and also manages statistical data of the performance of accessed main storage (500) and cache storage (400). Storage interface monitor (221) selects the best interface in accordance with the following condition determinations on the basis of the aforementioned monitoring and management results.

(1) Storage interface monitor (221) selects main storage interface device (240) when the data transfer rate of cache storage (400) approaches the maximum band and cache storage (400) has become overloaded. (2) Storage interface monitor (221) selects main storage interface device (240) when it is determined that the processing time of the requested output will be shortened by using only main storage interface device (240). Specifically, this is a case where it is determined that, for reasons such as there being a bias in the cache hits, it will be faster to ignore partially cached data and process the request using only main storage interface device (240) rather than dividing the output request into requests with respect to two types of storage. (3) The storage interface monitor (221) uses the cache storage interface device (250) when neither (1) nor (2) are applicable.

When cache storage interface device (250) is selected, the input/output request is changed in accordance with cache directory information and the data is retrieved from cache storage (400) (s105). When main storage interface device (240) is selected, the data is retrieved from main storage (500) (s104).

The processing conducted in steps (s104) and (s105) is conducted in parallel with respect to output request reference data partially cached in cache storage (400). However, even if some of the data is already cached in the cache storage, the output request can be completely processed in step (s104) in accordance with the information provided by storage interface monitor (221).

Figure 3:
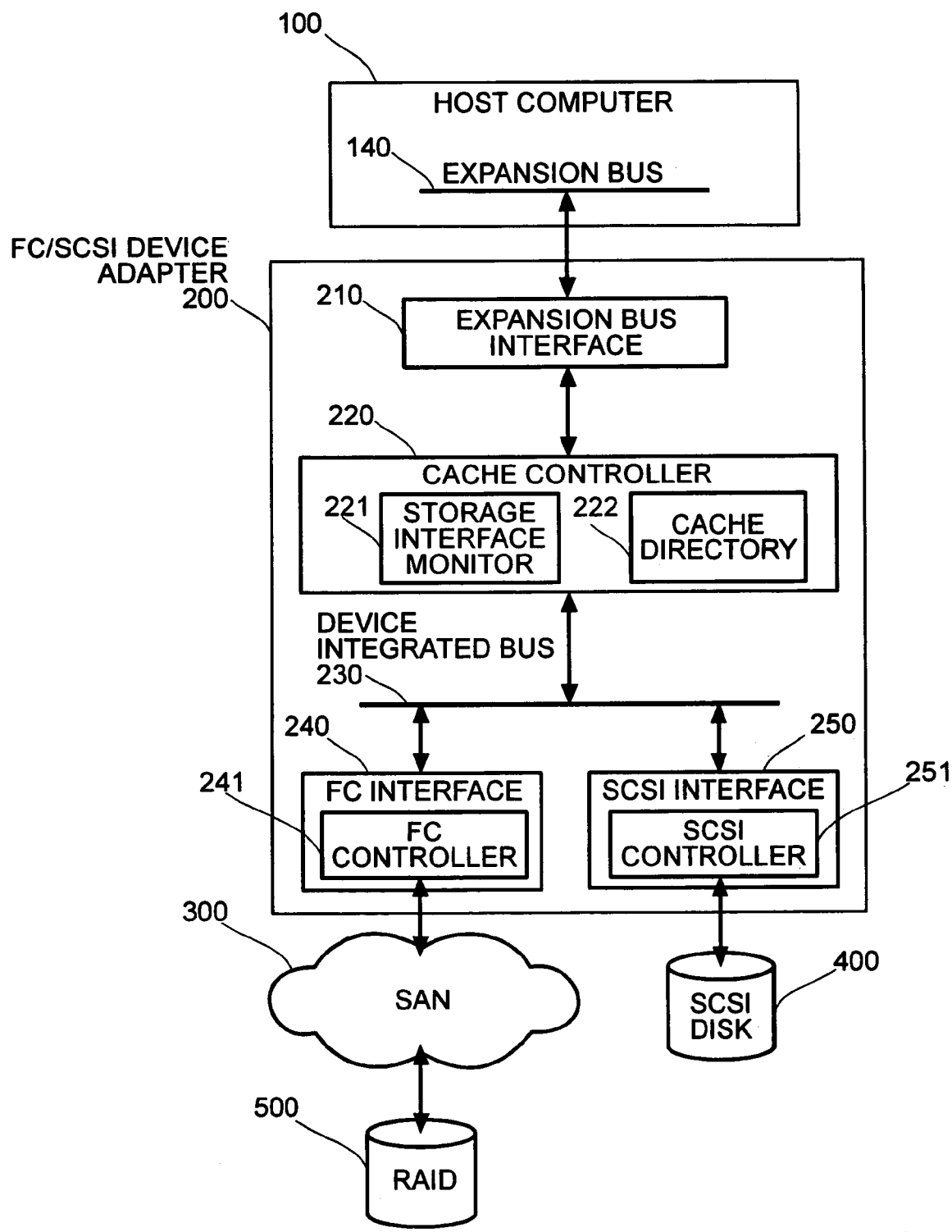
FIG. 3 is a block diagram showing a simplified example of an embodiment of the disclosed device adapter using a fiber channel and an SCSI interface.

FIG. 3 is a diagram that shows the configuration of FIG. 1 in greater detail and shows the configuration of an FC/SCSI device adapter (200) as device adapter (200). A SAN (300) and a RAID device (500) correspond to network (300) and main storage (500) of FIG. 1, and a SCSI disk (400) corresponds to cache storage (400). An FC interface device (240) that uses a fiber channel (FC) controller (241) to access RAID device (500) through SAN (300) corresponds to main storage interface device (240) of FIG. 1. A SCSI interface device (250) that uses a SCSI controller (251) corresponds to cache storage interface device (250) of FIG. 1.

FC/SCSI device adapter (200) is connected to host computer (100) using expansion bus (140). Cache controller (220) retains cache directory (222) that manages the region allocation of local cache SCSI disk (400).

Storage interface monitor (221) monitors the data transfer rate of FC interface device (240) and the data transfer rate of SCSI interface device (250), and also manages statistical data and the performance of each storage device accessed by the FC and the SCSI interfaces in the form of the average processing time of input/output requests matching the size of a fixed input/output request. Storage interface monitor (221) conducts the same condition determination as mentioned previously on the basis of the aforementioned monitoring and management results to select the best interface.

FIG. 4 shows an example of cache directory (222) that divides and manages regions of cache storage (500) into blocks of a fixed size. With respect to cache directory entries, whether the blocks are empty or whether the cached data is stored is represented, per block number (10), by block status (11). The cached data is represented by a device identification number (device ID) (13), and an address in the storage device and a data amount that starts with this address cached inside the blocks are identified by a starting sector number (14) and the number of sectors (15).

Cache hits or cache misses can be determined by comparing SCSI input/output request parameters with each cache input starting sector number (14) and the number of sectors (15) of the blocks of cached data stored in the cached data of a target device. By adding a final use time (12) to each entry, which represents the time data was finally accessed, it becomes possible to replace the cache data having the longest time not used when the cache storage is full—i.e., when all of the cache blocks are being used.

When host computer (100) issues a read SCSI command in s100 of FIG. 2, cache controller (220) uses the cache entries to search the cached data. In the case of a cache miss, the received SCSI command is sent directly to FC controller (241) so that the data can be retrieved from RAID device (400) through SAN (300). When the data is safely pulled out, cache controller (220) allocates a cache region in accordance with the cache directory, caches the data (i.e., writes the data in SCSI disk (400)) and inputs new cached data to cache directory (222). In the case of a cache hit, a storage to use is selected in accordance with an estimate of the input/output request completion time, whereby it becomes possible to achieve the highest performance and effectively use the SAN bandwidth for other purposes when the cache hit rate is high.

By using a large-capacity disk for local SCSI disk (400) connected to device adapter (200) of the present embodiment, it is possible to cache data of a gigabyte order. This enables all accessed files to be cached in local disk (SCSI disk) (400) and is particularly effective with respect to a video stream server that retrieves a large volume of data from RAID device (500).

For example, when the size of SCSI disk (400) is set in accordance with the working set of a video stream server—i.e., the sum of all video files including the sum of file sizes that a client device using the video stream server has most frequently accessed-all files are cached in SCSI disk (400) that is a cache storage, and all remote access to RAID device (500) is suppressed. Thus, because the actual data transfer bandwidth in SAN (300) expands and it becomes possible to use more stream servers even with the same SAN configuration, tile expandability of the system can be improved.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A device adapter that interconnects a host computer and a main storage, the device adapter including a cache storage interface device for accessing a cache storage, a main storage interface device for accessing the main storage via a network, and a cache controller that processes a data output request made by the host computer, the cache controller including:

a processing unit that caches data retrieved from the main storage in the cache storage;

a processing unit that manages use and allocation of storage regions of the cache storage;

a processing unit that manages load and performance information relating to the main storage and the cache storage;

a processing unit that determines whether or not the requested data is cached; and a processing unit that determines, when the requested data is cached, which of the cache storage and the main storage to use as the storage from which the requested data will be retrieved.

2. The device adapter of claim 1, wherein the cache processing unit does not cache the retrieved data in the cache storage in a case where the retrieved data has already been cached in the cache storage or where the data transfer bandwidth of the cache storage interface device exceeds a preset threshold.

3. The device adapter of claim 1, wherein the load information is the present data transfer rate of the main storage interface device and/or the cache storage interface device, and the processing unit determining the storage from which the requested data will be retrieved determines the storage with reference to the present data transfer rate.

4. The device adapter of claim 1, wherein the performance information is the average request processing time of the main storage interface device and/or the cache storage interface device, and the processing unit determining the storage from which the requested data will be retrieved determines the storage with reference to the average request processing time.

5. The device adapter of claim 1, wherein the main storage interface device includes an interface that is different from that of the cache storage interface device.

6. The device adapter of claim 3, wherein the main storage interface device includes a fiber channel interface.

7. The device adapter of claim 3, wherein the cache storage interface device includes an SCSI interface.

8. The device adapter of claim 1, wherein the cache controller further includes a cache storage region allocation processing unit.

9. The device adapter of claim 8, wherein the cache storage region allocation processing unit selects and replaces data that is to be replaced when the region of the cache storage cannot be used.

10. The device adapter of claim 1, wherein the processing unit judging whether or not the requested data is cached uses a disk sector number for the determination.

* * * * *